(12) United States Patent
Baumuller et al.

(10) Patent No.: US 7,662,057 B2
(45) Date of Patent: Feb. 16, 2010

(54) ECCENTRIC TENSIONING DEVICE

(75) Inventors: Rainer Baumuller, Herzogenaurach (DE); Roland Arneth, Eggolsheim (DE); Niels Flamig, Hessdorf (DE)

(73) Assignee: Schaeffler KG, Herzogenaurach (DE)

( * ) Notice: Subject to any disclaimer, the term of this patent is extended or adjusted under 35 U.S.C. 154(b) by 254 days.

(21) Appl. No.: 11/760,005

(22) Filed: Jun. 8, 2007

(65) Prior Publication Data

US 2008/0305903 A1   Dec. 11, 2008

(51) Int. Cl.
*F16H 7/08* (2006.01)
*F16H 7/12* (2006.01)
*F16H 9/16* (2006.01)

(52) U.S. Cl. .................. 474/112; 474/111; 474/101; 474/134; 474/135; 474/138

(58) Field of Classification Search ............ 474/112, 474/111, 109; *F16H 7/08; B23P 19/04; G03G 15/32*
See application file for complete search history.

(56) References Cited

U.S. PATENT DOCUMENTS

| | | | |
|---|---|---|---|
| 6,375,588 B1 * | 4/2002 | Frankowski et al. | 474/112 |
| 6,416,435 B1 * | 7/2002 | Szatkowski et al. | 474/112 |
| 2004/0180745 A1 * | 9/2004 | Dinca et al. | 474/135 |

FOREIGN PATENT DOCUMENTS

DE           4033777         4/1992

* cited by examiner

*Primary Examiner*—Robert A Siconolfi
*Assistant Examiner*—San Aung
(74) *Attorney, Agent, or Firm*—Volpe and Koenig, P.C.

(57) ABSTRACT

An eccentric tensioning device is provided for tensioning a power-transmission means constructed, for example, as a flat belt or toothed belt in a power-transmission means drive. The tensioning device can be brought into a pretensioned mounting state in an advantageous way. The eccentric tensioning device has a free roller device that includes a running disk and a roller bearing provided for supporting this disk, a working eccentric for supporting the free roller device, that can be displaced in the radial direction relative to the rotating axis of the roller bearing according to the magnitude of the pivoting of the working eccentric, a bearing journal device for supporting the working eccentric, a torsion spring for pretensioning the working eccentric, a fixing device for securing the working eccentric in a mounting position, in which the torsion spring is located in a pretensioned state, and an adjustment for supporting the bearing journal device. The adjustment eccentric has a rim encompassing the bearing journal device on an end facing away from a flange side and a passage device, through which an end region of the bearing journal device is accessible, is constructed in the region of this rim. In this way, it becomes possible in an advantageous way to create a tensioning device, in which the bearing journal device can be loaded on the end with an axial force used for the axial displacement of the working eccentric relative to the guide journal. It thus becomes possible to bring a tensioning device detached by unlocking the fixing device in an advantageous way into a pretensioned mounting state and in this way to reconfigure it into a mounting-ready state.

10 Claims, 4 Drawing Sheets

ECCENTRIC TENSIONING DEVICE

BACKGROUND

The present invention relates to an eccentric tensioning device for tensioning a power-transmission means constructed, for example, as a flat belt or toothed belt, in a power-transmission means drive. In particular, the invention here relates to an eccentric tensioning device, which is provided for integration into a power-transmission means drive of an internal combustion engine, which automatically guarantees a required pretensioning of the power-transmission means through an adjustment moment generated on the side of a spring device, and which can be kept in a preassembled mounting state for integration into the power-transmission means drive.

A tensioning device of the type noted above is known, for example, from DE 40 33 777 A1. This conventional tensioning device, also designated as a double eccentric tensioning device, comprises an adjustment eccentric, which makes available a bore arranged eccentrically for receiving an attachment screw. By means of the attachment screw, the tensioning device is mounted on a housing, especially a housing of the internal combustion engine, wherein the adjustment eccentric is supported by means of a base plate on the housing. Placed on this adjustment eccentric is a working or operating eccentric, with there being a slide bearing in an annular gap between a casing surface of the adjustment eccentric and an inner wall of the operating eccentric. On the outside, a surrounds the operating eccentric, whose outer ring functions directly as a running disk, which sits as such in the installed state, i.e., in the operating state, on the power-transmission means of the power-transmission means drive and applies a force to this with a transverse force directed perpendicular to the running direction. For achieving a non-positive contact of the running disk on the power-transmission means, between the base plate and the operating eccentric there is a torsion spring, which forces the operating eccentric and the running disk connected to this operating eccentric continuously into a position tensioning the power-transmission means.

SUMMARY

The invention is based on the objective of creating solutions, through which a tensioning device can be brought advantageously into a preassembled mounting state.

This objective is achieved according to the invention by an eccentric tensioning device for a power-transmission means drive, with:

A free roller device that as such comprises a running disk and a roller bearing provided for supporting this running disk, A working eccentric for supporting the free roller device such that this can be displaced in a radial direction relative to the rotating axis of the roller bearing according to the magnitude of the pivoting of the working eccentric, A bearing journal for supporting the working eccentric, A torsion spring for pretensioning the working eccentric, A fixing device for securing the working eccentric in a mounting position, in which the torsion spring is located in a pretensioned state, and An adjustment eccentric for supporting the bearing journal device, with the adjustment eccentric having a rim encompassing the bearing journal device on an end facing away from a flange side, and in the region of this rim there is a passage device, through which an end region of the bearing journal device is accessible.

Therefore, in an advantageous way it becomes possible to create a tensioning device, in which the bearing journal device can be loaded on the end with an axial force used for axial displacement of the working eccentric relative to the guide journal device without disassembling the adjustment eccentric. In this way, it becomes possible to bring a tensioning device detached by unlocking the fixing device in an advantageous way into a pretensioned mounting state and in this way to reconfigure it into a mounting-ready state.

Preferably, an engagement recess, in which a tool suitable for introducing a restoring moment can be inserted, is formed in an area exposed to the end of the tensioning device. This engagement recess can be constructed, in particular, as a hollow prism and here has, for example, a hexagonal or TORX-shaped cross section.

The passage device can be constructed as a passage opening or a recess open towards the peripheral edge region of the rim. The passage device can be constructed so that essentially no contaminants can find their way to the movement surfaces of the working eccentric. Here it is possible to provide covering elements that can be displaced in the axial or radial direction or to arrange elastomeric elements in the region of the passage device, through which the passage space can be closed again after completing the reconfiguring of the tensioning device.

According to an especially preferred embodiment of the invention, it is possible to insert a peg element in the passage device, by means of which adjustment forces can be transmitted to the end of the bearing journal device from the end of the adjustment eccentric.

According to an especially preferred embodiment of the invention, the fixing device is constructed such that this automatically detaches in the course of tightening the attachment screw, through which as such the eccentric tensioning device, in particular the adjustment eccentric of this device, is screwed onto the flange surface carrying the tensioning device. This automatic detachment or release process of the fixing device can be initiated, in particular, in that a free switching path is traversed or an axial play in the tensioning device is overcome within the scope of attaching the eccentric tensioning device to the flange surface of components of the tensioning device under the effect of the axial force applied by the attachment screw. In the course of overcoming this axial play, especially against an axial force applied by the torsion spring, an engagement structure of the fixing device can be brought into a released state.

The reconfiguration of a detached tensioning device into the original state can be performed according to the invention in that the working eccentric is turned back by a wrench attached to this eccentric opposite the pivoting direction caused by the torsion spring, and the pivoted restoring position by means of the passage device, the bearing journal device is forced axially away from the rim of the adjustment eccentric.

The invention is designed especially for tensioning devices, which guarantee a nearly constant pretensioning force of the power-transmission means under design-specific operating conditions.

BRIEF DESCRIPTION OF THE DRAWINGS

Additional details and features of the invention emerge from the following description in connection with the drawing. Shown are.

DETAILED DESCRIPTION OF THE PREFERRED EMBODIMENTS

Figure 1:
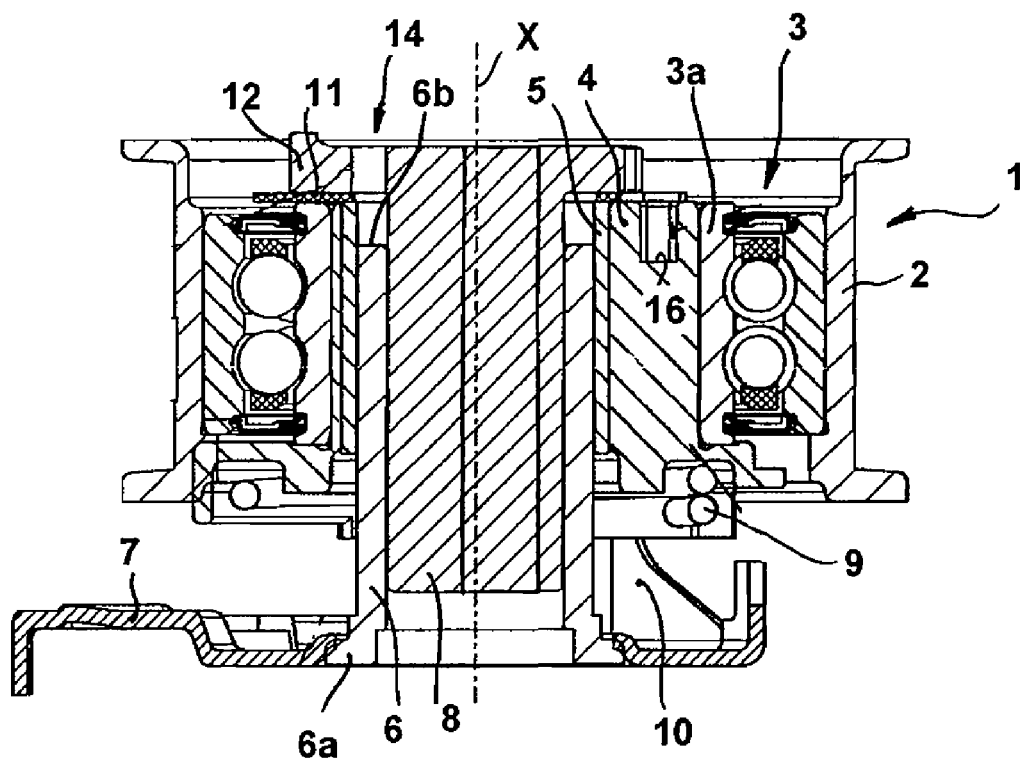
FIG. 1 an axial section view for illustrating the setup of a tensioning device according to the invention with an operating eccentric and an adjustment eccentric and also a fixing device according to the invention.

The eccentric tensioning device shown in FIG. 1 is used as such for tensioning a power-transmission means of a power-transmission means drive constructed as a flat belt, in particular, as a toothed belt. This eccentric tensioning device comprises a free roller device 1, which comprises a running disk 2 and a roller bearing 3 provided for supporting this disk and constructed as a double-row deep-groove ball bearing. The roller bearing 3 comprises an inner ring 3a, which as such sits on a working eccentric 4 that can pivot about an eccentric axis X.

The working eccentric 4 in turn sits on a bearing journal device 6 constructed here as a bushing with a slide bearing bushing 5 arranged in-between. The bearing journal device 6 is anchored in turn on a base plate structure 7 with a lower peripheral edge section 6a. In the bearing journal device 6 there is an eccentric element acting as an adjustment eccentric 8.

The eccentric tensioning device shown here is constructed such that its working eccentric 4 can be locked relative to the base plate structure 7 in a pivoted position, in which a torsion spring 9 provided for generating the tension-regulating torque is pretensioned. Securing the working eccentric 4 in this pivoted position is implemented by a fixing device 10, which in this embodiment has an engagement structure, which is constructed in one piece with the base plate structure 7 and which can be brought into engagement in this pivoted position with a counter structure constructed corresponding to the working eccentric 4.

The system state shown in FIG. 1 for the eccentric tensioning device involves a so-called mounting state, i.e., a state in which the eccentric tensioning device can be set on a flange surface and in which a relatively large distance of the running disk device 1 from the running path of the power-transmission means achieved in the operating position is produced. This special mounting state allows power-transmission means to be placed relatively easily on the running disks of the power-transmission means drive provided for realizing a corresponding power-transmission means drive without this placement work being disrupted by the eccentric tensioning device.

The eccentric tensioning device shown here is constructed such that the pretensioning state of the working eccentric is nullified, in that in the scope of the final attachment of the eccentric tensioning device, an attachment screw provided for binding the adjustment eccentric 8 to a flange surface not shown in more detail here is tightened and in this way the adjustment eccentric 8 is displaced relative to the base plate structure 7 together with the working eccentric 4 projecting thereon by means of a stop disk device 11. In the scope of this displacement, a free switching path is overcome, whereby the fixing device 10 is led into a released state, in which the working eccentric 4 is pivoted under the effect of the torsion-spring device 9 and thus the running disk device 1 is forced against the associated power-transmission means.

The eccentric tensioning device shown here is distinguished in that the adjustment eccentric 8 has a rim 12 at least partially radially encompassing the working eccentric 4. The working eccentric 4 is secured axially in the installed state by means of this rim 12. In the region of the rim there is a passage recess 14, through which an end region 6b of the bearing journal device 6 for applying a force for displacing the bearing journal device 6 axially relative to the working eccentric 4 is accessible.

Through this concept, it becomes possible to reconfigure a tensioning device already unlocked by releasing the fixing device 10 and in this way to fix the working eccentric 4 back in a pivoted and axial position corresponding to the mounting position. The application of the pressure force acting on the end side 6b of the bearing journal device 6 can be realized by actuation elements, which are guided as such in the scope of reconfiguring the eccentric tensioning device through the passage recess 14.

Pivoting the working eccentric 4 back can be realized in that a wrench constructed, for example, as a hexagonal socket wrench, is inserted into an engagement recess 16 formed in the working eccentric 4 and a pivoting moment turning back the working eccentric 4 into the pretensioned position is introduced via this wrench. This hexagonal socket wrench can form part of a special tool, which comprises as such a decoupling mechanism and thus also the actuation element provided for the passage through the passage recess 14.

The engagement recess 16 is located in the working eccentric 4 at a position, at which this has a relatively large wall thickness. It is possible to shorten the rim 12 radially in the pivoting range of the engagement recess 16, so that in this way sufficient access to the engagement recess 16 is given.

Figure 2:
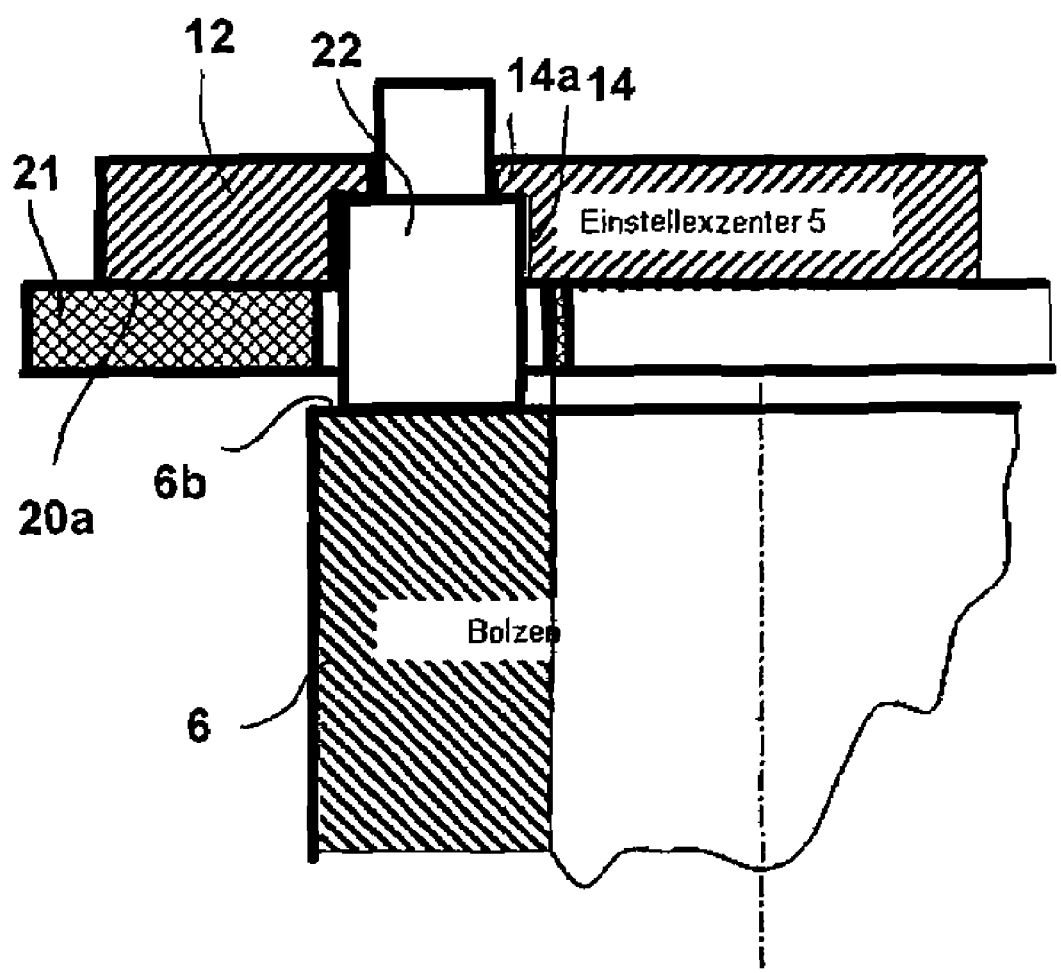
FIG. 2 a detail schematic view for illustrating a variant of the tensioning device according to the invention with a pin element inserted into the passage recess, FIG. 3 a perspective view of the eccentric tensioning device according to FIG. 1 looking at the bottom side of a base plate device of the eccentric tensioning device.

In FIG. 2, in the form of a schematic view it is illustrated how a pin element 22 can be inserted into the passage recess 14 formed in the rim 12, which as such closes the passage recess 14 but allows the transmission of an axial force acting on the end 6b of the bearing journal device 6.

In the embodiment shown here, a stop disk 21 acting as a damping element is located between the end 6b of the bearing journal device 6 and the bottom side 20a of the rim 12. This stop disk 21 is preferably constructed so that this allows a passage of the pin 22 at least in a certain pivoted position of the working eccentric 4. The pin 22 in this embodiment has a stepped construction, such that this is secured from falling out of the passage recess 14 by means of an annular shoulder 14a formed on the passage recess 14. It is also possible to secure the pin 22 captively in some other way. In particular, it is possible to connect the pin 22 also to the stop disk 21.

Figure 3:
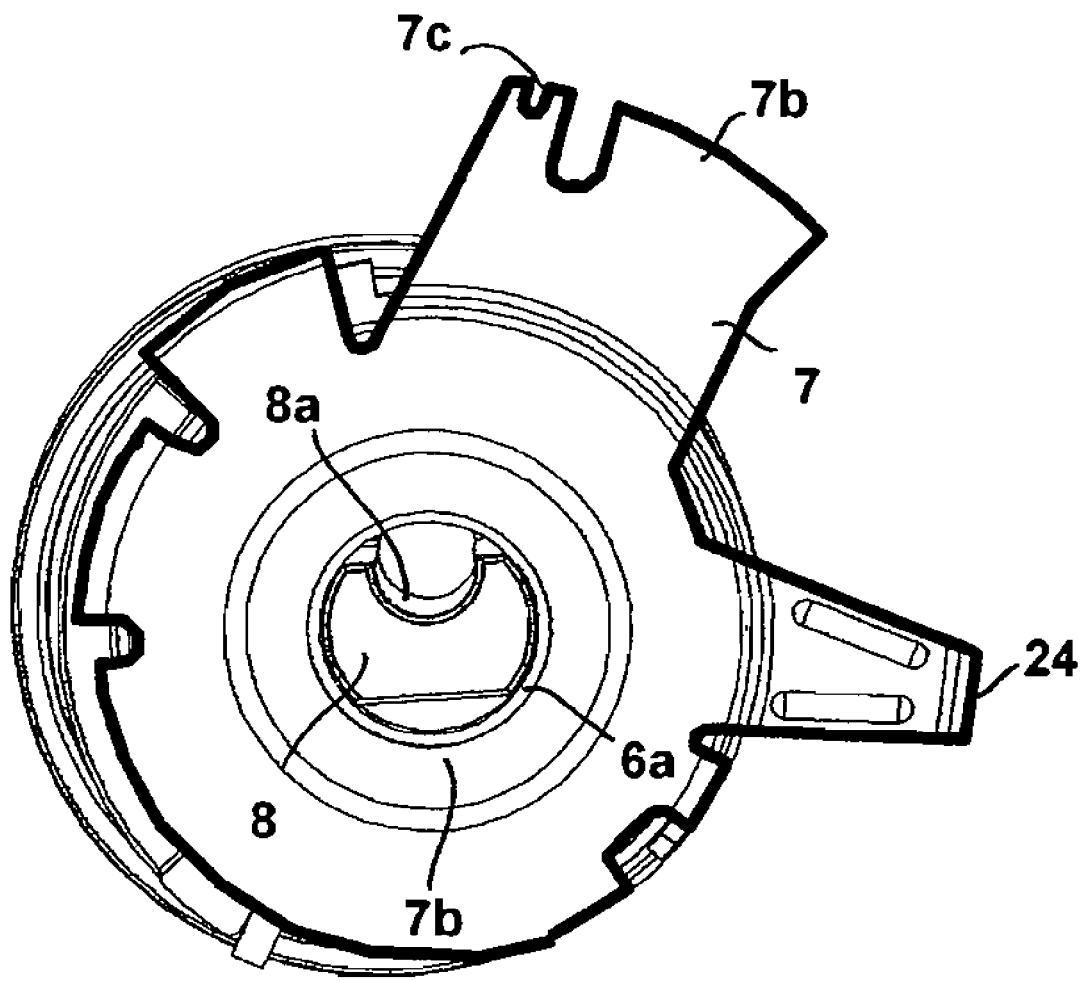

In FIG. 3, the base plate structure 7 of the eccentric tensioning device is shown from below in the form of a perspective view. On the base plate structure 7, an inner peripheral edge section is formed, on which a foot region 6a of the bearing journal device 6 is anchored rigidly and locked in rotation. As can be seen in this view, the adjustment eccentric 8 sits in the bearing bushing device 6. This adjustment eccentric 8 is provided with a longitudinal recess 8a, which as such is used for receiving an attachment screw provided for connecting the tensioning device to a flange surface. On the base plate structure 7 there is a projection 24, through which the base plate structure 7 can be anchored locked in rotation on the corresponding flange surface. On the base plate structure 7, there is furthermore a radially outwardly projecting arm section 7b, in which a marking constructed here as a small recess 7c is formed.

The tensioning device constructed according to the invention can be reconfigured in an especially advantageous way under the use of a combination tool. This combination tool here preferably comprises a socket wrench section that can be brought into engagement with the working eccentric and a decoupling finger provided for axial displacement of the bearing journal device 6. This decoupling finger can be inserted through the passage recess 14 for corresponding placement of the mounting tool or at least can act on a transmission element arranged in the passage recess 14. In order to bring the toothed-belt tensioner back into its delivery state, preferably several processes are performed by the pretensioning tool. Through the mounting tool, in particular, the working eccentric is pivoted into its mounting position. For this purpose, with the help of the tool, the working eccentric is loaded with a corresponding torque. This torque is introduced into the working eccentric by a component of the pretensioning tool, especially by a hexagon socket wrench, engaging with a positive fit on the working eccentric. In the embodiment shown here, an internal hexagon is formed in the working eccentric, in order to receive the hexagonal socket of the pretensioning tool.

When the working eccentric is located in the pivoted mounting position, relative motion between the bearing journal device and the working eccentric is generated. So that this pivoted position of the working eccentric that is suitable for axial displacement of the components named above can be identified, a marking is attached to the base plate structure. In order to perform relative motion between the pin and working eccentric, for example, the pretensioning tool presses on the bearing journal or pin end by means of a pin. In order to be able to press onto the pin, a passage recess is formed in the adjustment eccentric, such that access to the pin is produced. To prevent water from entering into the bearing, this passage opening can be later closed by a stopper. A device, which closes again after removal of the pin located on the mounting tool, can also be provided on the stop disk.

Furthermore, it is possible to integrate a pin, which is secured captively with a positive fit and is used through the relative movement between the pin and working eccentric, in the adjustment eccentric, as described above in connection with FIG. 2. This pin can also be coupled with the stop disk or the adjustment eccentric by a flexible connection structure, so that the positive-fit captive securing of this pin can be eliminated. At least the scale of potential moisture entry into the slide bearing is reduced by the pin. A compression spring, which presses the pin against the adjustment surface of the bolt, can be inserted between the pin and adjustment eccentric. When the working eccentric is located in the work position, the top part of the pin comes completely out of the adjustment eccentric.

Figure 4:
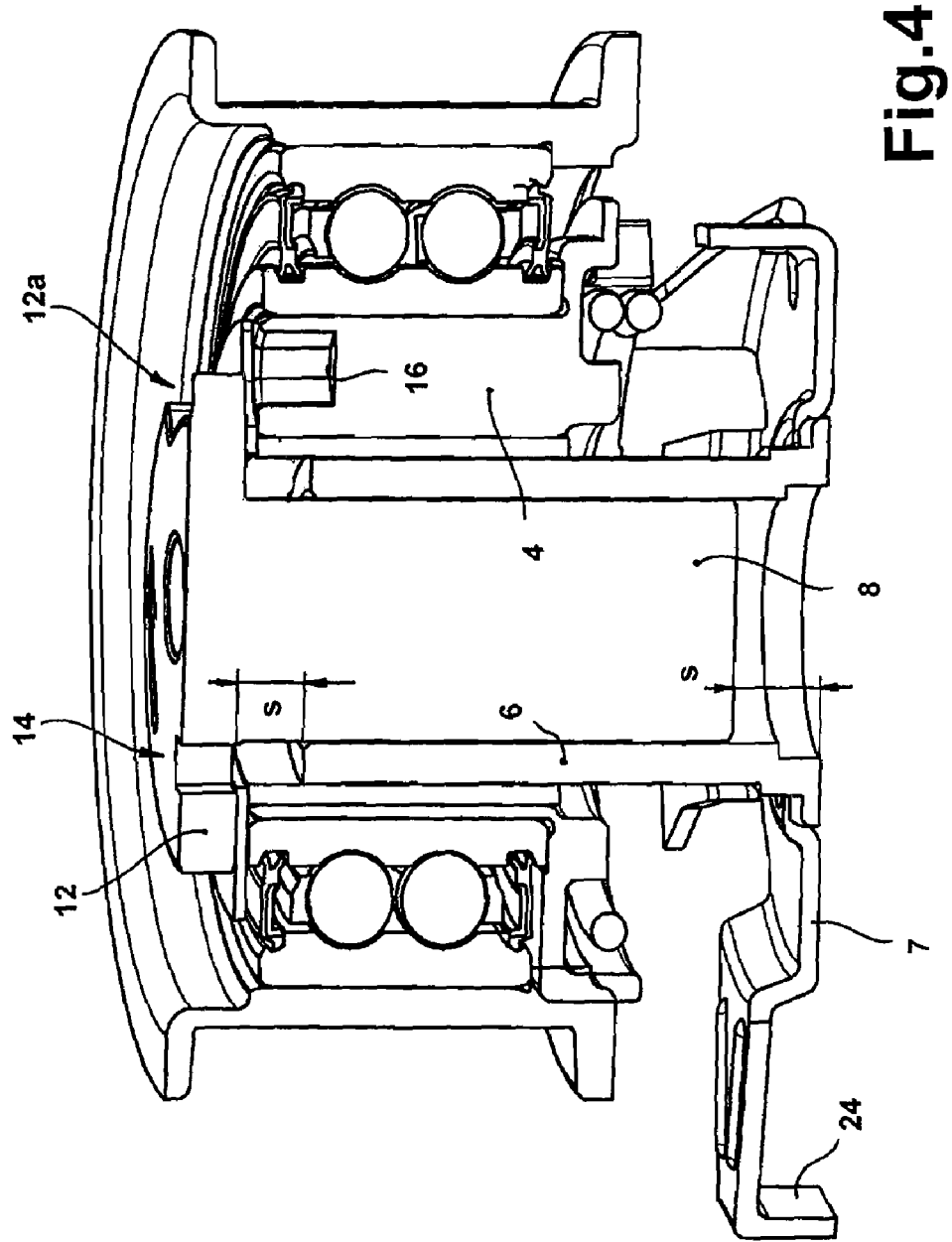
FIG. 4 another perspective view of the eccentric tensioning device for illustrating a special adaptation of the geometry of the adjustment eccentric and the engagement recess of the working eccentric and also for illustrating the free switching paths.

In FIG. 4, a special adaptation of the geometry of the adjustment eccentric 8, especially the rim 12 of this eccentric, to the engagement recess 16 of the working eccentric 4 is illustrated in the form of another perspective view. The rim 12 is provided with a recess 12a at a certain peripheral position. This recess 12a is constructed and arranged so that when a wrench is inserted, especially a hexagonal socket wrench, into the engagement recess 16, a kinematic coupling of the adjustment eccentric 8 with the working eccentric 4 is achieved by this wrench. If the working eccentric 4 is now pivoted due to a torque applied to the wrench, then the wrench acts as a catch, by means of which the adjustment eccentric 8 is also pivoted. Through this concept, it is possible in an especially advantageous way to produce a configuration of the tensioning device, in which an optimum pivoted angle of the working eccentric 4 and the adjustment eccentric 8 relative to the catch 24 of the base plate 7 is produced for the mounting state.

In the view from FIG. 4, the passage device 14 constructed with a rectangular cross section is also shown here. By means of this passage opening, it becomes possible to load the end 6b of the bearing journal 6 by means of a decoupling element and thus to produce the axial offset s that can be recognized here. In the position shown here, the working eccentric 4 is already located in a locking state with a locking device provided on the side of the base plate 7. This locking state can be nullified through axial displacement of the adjustment eccentric 8 in the direction of the base plate 7. The axial offset s, i.e., the distance between the end 6b and the bottom side of the rim 12 can be dimensioned so that this is slightly smaller than the distance s' between the bottom side of the adjustment eccentric 8 and the bottom side of the base plate 7. In this way it is guaranteed that in the installed state the rim 12 sits on the end face 6b under the effect of an attachment screw and thus the base plate 7 is tensioned against the corresponding flange surface.

Although the rim 12 of the adjustment eccentric 8 is constructed integrated with the adjustment eccentric 8 in the embodiments described above, the invention is not limited to such variants. It is also possible to produce the adjustment eccentric 8 as a structure composed of several parts and to construct the rim 12, for example, as a disk structure, which is set on a core journal section of the adjustment eccentric 8.

The invention claimed is:

1. Eccentric tensioning device for a power-transmission means drive, comprising:
   a free roller device, which comprises a running disk and a roller bearing provided for supporting the disk,
   a working eccentric for supporting the free roller device, such that the free roller device can be displaced in a radial direction relative to a rotation axis of the roller bearing according to a magnitude of a pivoting of the working eccentric,
   a bearing journal device for supporting the working eccentric,
   a torsion spring for pretensioning the working eccentric,
   a fixing device for securing the working eccentric in an assembled position, in which the torsion spring is in a pretensioned state, and the working eccentric is fixed in an axial direction relative to the bearing journal, and
   an adjustment eccentric for supporting the bearing journal device, wherein the adjustment eccentric has a rim radially encompassing the bearing journal device on an end facing away from a flange side, and a passage recess constructed in a region of the rim, through which an end region of the bearing journal device is accessible for applying a force for displacing the bearing journal device relative to the working eccentric in the axial direction.

2. Eccentric tensioning device according to claim 1, wherein the passage recess is constructed as a passage opening which perforates the rim in the axial direction.

3. Eccentric tensioning device according to claim 1, wherein the bearing journal device comprises a bushing element and the passage recess leads to an end face of the bushing element.

4. Eccentric tensioning device according to claim 3, characterized in that a pin element is inserted into the passage recess.

5. Eccentric tensioning device according to claim 4, wherein the pin element is secured by captive securing in the passage recess.

6. Eccentric tensioning device according to claim 5, wherein the pin element is connected to a stop disk, which projects on a bottom side of the rim.

7. Eccentric tensioning device according to claim 1, wherein the working eccentric is provided with an engagement device for introducing a restoring torque moment used for reconfiguring into a mounting state.

8. Eccentric tensioning device according to claim 7, wherein the engagement device is constructed as a recess suitable for receiving a socket wrench.

9. Eccentric tensioning device according to claim 8, wherein the recess is located in a relatively thick-walled region of the working eccentric.

10. Eccentric tensioning device according to claim 1, wherein the bearing journal device is connected to a base plate structure, and a marking is constructed on the base plate structure, through which it can be identified whether the working eccentric is located in a pretensioned position.

* * * * *